(12) United States Patent
Li et al.

(10) Patent No.: US 8,575,811 B2
(45) Date of Patent: Nov. 5, 2013

(54) MOTOR

(75) Inventors: Yue Li, Hong Kong (CN); Bao Ting Liu, Shenzhen (CN); Ji Cheng Pan, Shenzhen (CN); Mao Xiong Jiang, Shenzhen (CN); Yong Qiang Song, Shenzhen (CN); Ji Dong Chai, Shenzhen (CN)

(73) Assignee: Johnson Electric S.A., Murten (CH)

( * ) Notice: Subject to any disclaimer, the term of this patent is extended or adjusted under 35 U.S.C. 154(b) by 370 days.

(21) Appl. No.: 12/839,889

(22) Filed: Jul. 20, 2010

(65) Prior Publication Data

US 2011/0012470 A1    Jan. 20, 2011

(30) Foreign Application Priority Data

Jul. 20, 2009 (CN) .......................... 2009 1 0108820

(51) Int. Cl.
*H02K 23/26* (2006.01)
(52) U.S. Cl.
USPC ........................................ 310/198; 310/195
(58) Field of Classification Search
USPC .................... 310/195, 196, 181, 186
See application file for complete search history.

(56) References Cited

U.S. PATENT DOCUMENTS

| 1,862,427 | A | * | 6/1932 | Della Riccia Angelo | ..... 323/203 |
| 3,790,835 | A | * | 2/1974 | Takeda | .......... 310/268 |
| 7,388,312 | B2 | * | 6/2008 | Hyodo et al. | ................. 310/198 |
| 2005/0184612 | A1 | * | 8/2005 | Cros et al. | ..................... 310/158 |
| 2008/0093943 | A1 | * | 4/2008 | Roos | ........................ 310/154.45 |

FOREIGN PATENT DOCUMENTS

CN         101436809        5/2009

* cited by examiner

*Primary Examiner* — Dang Le
(74) *Attorney, Agent, or Firm* — Muncy, Geissler, Olds & Lowe, PLLC

(57) ABSTRACT

A motor has a stator and a rotor. The stator has 2P poles wherein P is an integer greater than one. The rotor has a shaft, a rotor core and a commutator fixed to the shaft. The commutator has m segments where m is an even integer greater than P. Every two adjacent segments are electrically connected by a winding unit so that the rotor winding comprises m winding units with at least one of the winding units comprising P coils connected in series; and each coil of each winding unit is directly connected to a corresponding two segments.

21 Claims, 5 Drawing Sheets

| segment | winding slot | | segment | winding slot | | segment | winding slot | | segment | winding slot | | segment |
|---|---|---|---|---|---|---|---|---|---|---|---|---|
| | in | out | | in | out | | in | out | | in | out | |
| $Z_1$ | $S_5$ | $S_1$ | $Z_{19}$ | $S_{14}$ | $S_{10}$ | $Z_2$ | $S_6$ | $S_{10}$ | $Z_{20}$ | $S_{15}$ | $S_1$ | $Z_3$ |
| $Z_3$ | $S_6$ | $S_2$ | $Z_{21}$ | $S_{15}$ | $S_{11}$ | $Z_4$ | $S_7$ | $S_{11}$ | $Z_{22}$ | $S_{16}$ | $S_2$ | $Z_5$ |
| $Z_5$ | $S_7$ | $S_3$ | $Z_{23}$ | $S_{16}$ | $S_{12}$ | $Z_6$ | $S_8$ | $S_{12}$ | $Z_{24}$ | $S_{17}$ | $S_3$ | $Z_7$ |
| $Z_7$ | $S_8$ | $S_4$ | $Z_{25}$ | $S_{17}$ | $S_{13}$ | $Z_8$ | $S_9$ | $S_{13}$ | $Z_{26}$ | $S_{18}$ | $S_4$ | $Z_9$ |
| $Z_9$ | $S_9$ | $S_5$ | $Z_{27}$ | $S_{18}$ | $S_{14}$ | $Z_{10}$ | $S_{10}$ | $S_{14}$ | $Z_{28}$ | $S_1$ | $S_5$ | $Z_{11}$ |
| $Z_{11}$ | $S_{10}$ | $S_6$ | $Z_{29}$ | $S_1$ | $S_{15}$ | $Z_{12}$ | $S_{11}$ | $S_{15}$ | $Z_{30}$ | $S_2$ | $S_6$ | $Z_{13}$ |
| $Z_{13}$ | $S_{11}$ | $S_7$ | $Z_{31}$ | $S_2$ | $S_{16}$ | $Z_{14}$ | $S_{12}$ | $S_{16}$ | $Z_{32}$ | $S_3$ | $S_7$ | $Z_{15}$ |
| $Z_{15}$ | $S_{12}$ | $S_8$ | $Z_{33}$ | $S_3$ | $S_{17}$ | $Z_{16}$ | $S_{13}$ | $S_{17}$ | $Z_{34}$ | $S_4$ | $S_8$ | $Z_{17}$ |
| $Z_{17}$ | $S_{13}$ | $S_9$ | $Z_{35}$ | $S_4$ | $S_{18}$ | $Z_{18}$ | $S_{14}$ | $S_{18}$ | $Z_{36}$ | $S_5$ | $S_9$ | $Z_1$ |

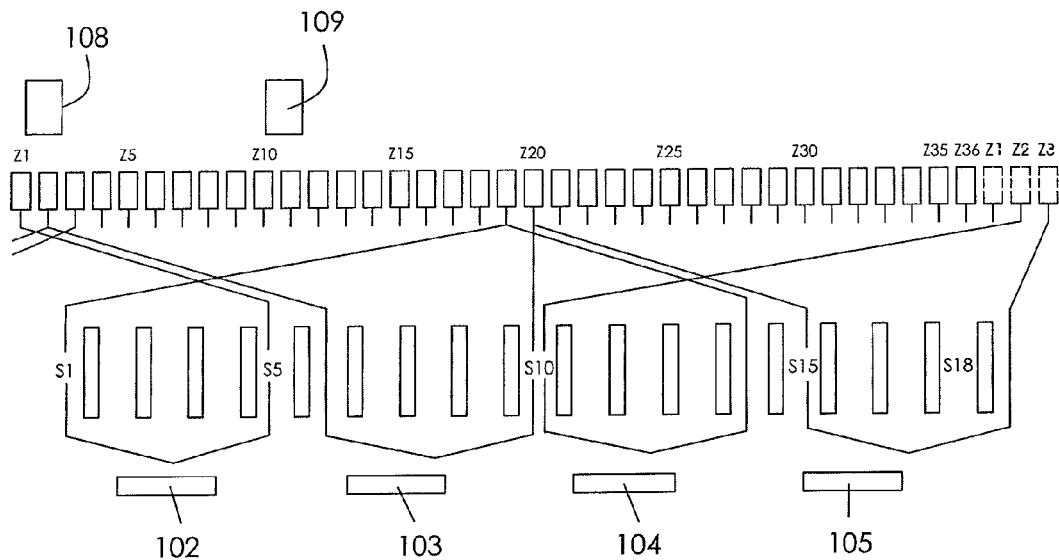

FIG. 3

| segment | winding slot | | segment | winding slot | | segment | winding slot | | segment | winding slot | | segment |
|---|---|---|---|---|---|---|---|---|---|---|---|---|
| | in | out | | in | out | | in | out | | in | out | |
| $Z_1$ | $S_5$ | $S_1$ | $Z_{19}$ | $S_{14}$ | $S_{10}$ | $Z_2$ | $S_6$ | $S_{10}$ | $Z_{20}$ | $S_{15}$ | $S_1$ | $Z_3$ |
| $Z_3$ | $S_6$ | $S_2$ | $Z_{21}$ | $S_{15}$ | $S_{11}$ | $Z_4$ | $S_7$ | $S_{11}$ | $Z_{22}$ | $S_{16}$ | $S_2$ | $Z_5$ |
| $Z_5$ | $S_7$ | $S_3$ | $Z_{23}$ | $S_{16}$ | $S_{12}$ | $Z_6$ | $S_8$ | $S_{12}$ | $Z_{24}$ | $S_{17}$ | $S_3$ | $Z_7$ |
| $Z_7$ | $S_8$ | $S_4$ | $Z_{25}$ | $S_{17}$ | $S_{13}$ | $Z_8$ | $S_9$ | $S_{13}$ | $Z_{26}$ | $S_{18}$ | $S_4$ | $Z_9$ |
| $Z_9$ | $S_9$ | $S_5$ | $Z_{27}$ | $S_{18}$ | $S_{14}$ | $Z_{10}$ | $S_{10}$ | $S_{14}$ | $Z_{28}$ | $S_1$ | $S_5$ | $Z_{11}$ |
| $Z_{11}$ | $S_{10}$ | $S_6$ | $Z_{29}$ | $S_1$ | $S_{15}$ | $Z_{12}$ | $S_{11}$ | $S_{15}$ | $Z_{30}$ | $S_2$ | $S_6$ | $Z_{13}$ |
| $Z_{13}$ | $S_{11}$ | $S_7$ | $Z_{31}$ | $S_2$ | $S_{16}$ | $Z_{14}$ | $S_{12}$ | $S_{16}$ | $Z_{32}$ | $S_3$ | $S_7$ | $Z_{15}$ |
| $Z_{15}$ | $S_{12}$ | $S_8$ | $Z_{33}$ | $S_3$ | $S_{17}$ | $Z_{16}$ | $S_{13}$ | $S_{17}$ | $Z_{34}$ | $S_4$ | $S_8$ | $Z_{17}$ |
| $Z_{17}$ | $S_{13}$ | $S_9$ | $Z_{35}$ | $S_4$ | $S_{18}$ | $Z_{18}$ | $S_{14}$ | $S_{18}$ | $Z_{36}$ | $S_5$ | $S_9$ | $Z_1$ |

FIG. 4

| segment | winding slot | | segment | winding slot | | segment | winding slot | | segment | winding slot | | segment |
|---|---|---|---|---|---|---|---|---|---|---|---|---|
| | in | out | | in | out | | in | out | | in | out | |
| $Z_1$ | $S_7$ | $S_1$ | $Z_{27}$ | $S_{20}$ | $S_{14}$ | $Z_2$ | $S_8$ | $S_{14}$ | $Z_{28}$ | $S_{21}$ | $S_1$ | $Z_3$ |
| $Z_3$ | $S_8$ | $S_2$ | $Z_{29}$ | $S_{21}$ | $S_{15}$ | $Z_4$ | $S_9$ | $S_{15}$ | $Z_{30}$ | $S_{22}$ | $S_2$ | $Z_5$ |
| $Z_5$ | $S_9$ | $S_3$ | $Z_{31}$ | $S_{22}$ | $S_{16}$ | $Z_6$ | $S_{10}$ | $S_{16}$ | $Z_{32}$ | $S_{23}$ | $S_3$ | $Z_7$ |
| $Z_7$ | $S_{10}$ | $S_4$ | $Z_{33}$ | $S_{23}$ | $S_{17}$ | $Z_8$ | $S_{11}$ | $S_{17}$ | $Z_{34}$ | $S_{24}$ | $S_4$ | $Z_9$ |
| $Z_9$ | $S_{11}$ | $S_5$ | $Z_{35}$ | $S_{24}$ | $S_{18}$ | $Z_{10}$ | $S_{12}$ | $S_{18}$ | $Z_{36}$ | $S_{25}$ | $S_5$ | $Z_{11}$ |
| $Z_{11}$ | $S_{12}$ | $S_6$ | $Z_{37}$ | $S_{25}$ | $S_{19}$ | $Z_{12}$ | $S_{13}$ | $S_{19}$ | $Z_{38}$ | $S_{26}$ | $S_6$ | $Z_{13}$ |
| $Z_{13}$ | $S_{13}$ | $S_7$ | $Z_{39}$ | $S_{26}$ | $S_{20}$ | $Z_{14}$ | $S_{14}$ | $S_{20}$ | $Z_{40}$ | $S_1$ | $S_7$ | $Z_{15}$ |
| $Z_{15}$ | $S_{14}$ | $S_8$ | $Z_{41}$ | $S_1$ | $S_{21}$ | $Z_{16}$ | $S_{15}$ | $S_{21}$ | $Z_{42}$ | $S_2$ | $S_8$ | $Z_{17}$ |
| $Z_{17}$ | $S_{15}$ | $S_9$ | $Z_{43}$ | $S_2$ | $S_{22}$ | $Z_{18}$ | $S_{16}$ | $S_{22}$ | $Z_{44}$ | $S_3$ | $S_9$ | $Z_{19}$ |
| $Z_{19}$ | $S_{16}$ | $S_{10}$ | $Z_{45}$ | $S_3$ | $S_{23}$ | $Z_{20}$ | $S_{17}$ | $S_{23}$ | $Z_{46}$ | $S_4$ | $S_{10}$ | $Z_{21}$ |
| $Z_{21}$ | $S_{17}$ | $S_{11}$ | $Z_{47}$ | $S_4$ | $S_{24}$ | $Z_{22}$ | $S_{18}$ | $S_{24}$ | $Z_{48}$ | $S_5$ | $S_{11}$ | $Z_{23}$ |
| $Z_{23}$ | $S_{18}$ | $S_{12}$ | $Z_{49}$ | $S_5$ | $S_{25}$ | $Z_{24}$ | $S_{19}$ | $S_{25}$ | $Z_{50}$ | $S_6$ | $S_{12}$ | $Z_{25}$ |
| $Z_{25}$ | $S_{19}$ | $S_{13}$ | $Z_{51}$ | $S_6$ | $S_{26}$ | $Z_{26}$ | $S_{20}$ | $S_{26}$ | $Z_{52}$ | $S_7$ | $S_{13}$ | $Z_1$ |

FIG. 6

| Segment | Winding Slot | | Segment | Winding Slot | | Segment | Winding Slot | | Segment |
|---|---|---|---|---|---|---|---|---|---|
| | in | out | | in | out | | in | out | |
| $Z_1$ | $S_5$ | $S_1$ | $Z_{19}$ | $S_{14}$ | $S_{10}$ | $Z_{37}$ | $S_{23}$ | $S_{19}$ | $Z_2$ |
| $Z_2$ | $S_6$ | $S_{10}$ | $Z_{20}$ | $S_{15}$ | $S_{19}$ | $Z_{38}$ | $S_{24}$ | $S_1$ | $Z_3$ |
| $Z_3$ | $S_6$ | $S_2$ | $Z_{21}$ | $S_{15}$ | $S_{11}$ | $Z_{39}$ | $S_{24}$ | $S_{20}$ | $Z_4$ |
| $Z_4$ | $S_7$ | $S_{11}$ | $Z_{22}$ | $S_{16}$ | $S_{20}$ | $Z_{40}$ | $S_{25}$ | $S_2$ | $Z_5$ |
| $Z_5$ | $S_7$ | $S_3$ | $Z_{23}$ | $S_{16}$ | $S_{12}$ | $Z_{41}$ | $S_{25}$ | $S_{21}$ | $Z_6$ |
| $Z_6$ | $S_8$ | $S_{12}$ | $Z_{24}$ | $S_{17}$ | $S_{21}$ | $Z_{42}$ | $S_{26}$ | $S_3$ | $Z_7$ |
| $Z_7$ | $S_8$ | $S_4$ | $Z_{25}$ | $S_{17}$ | $S_{13}$ | $Z_{43}$ | $S_{26}$ | $S_{22}$ | $Z_8$ |
| $Z_8$ | $S_9$ | $S_{13}$ | $Z_{26}$ | $S_{18}$ | $S_{22}$ | $Z_{44}$ | $S_{27}$ | $S_4$ | $Z_9$ |
| $Z_9$ | $S_9$ | $S_5$ | $Z_{27}$ | $S_{18}$ | $S_{14}$ | $Z_{45}$ | $S_{27}$ | $S_{23}$ | $Z_{10}$ |
| $Z_{10}$ | $S_{10}$ | $S_{14}$ | $Z_{28}$ | $S_{19}$ | $S_{23}$ | $Z_{46}$ | $S_1$ | $S_5$ | $Z_{11}$ |
| $Z_{11}$ | $S_{10}$ | $S_6$ | $Z_{29}$ | $S_{19}$ | $S_{15}$ | $Z_{47}$ | $S_1$ | $S_{24}$ | $Z_{12}$ |
| $Z_{12}$ | $S_{11}$ | $S_{15}$ | $Z_{30}$ | $S_{20}$ | $S_{24}$ | $Z_{48}$ | $S_2$ | $S_6$ | $Z_{13}$ |
| $Z_{13}$ | $S_{11}$ | $S_7$ | $Z_{31}$ | $S_{20}$ | $S_{16}$ | $Z_{49}$ | $S_2$ | $S_{25}$ | $Z_{14}$ |
| $Z_{14}$ | $S_{12}$ | $S_{16}$ | $Z_{32}$ | $S_{21}$ | $S_{25}$ | $Z_{50}$ | $S_3$ | $S_7$ | $Z_{15}$ |
| $Z_{15}$ | $S_{12}$ | $S_8$ | $Z_{33}$ | $S_{21}$ | $S_{17}$ | $Z_{51}$ | $S_3$ | $S_{26}$ | $Z_{16}$ |
| $Z_{16}$ | $S_{13}$ | $S_{17}$ | $Z_{34}$ | $S_{22}$ | $S_{26}$ | $Z_{52}$ | $S_4$ | $S_8$ | $Z_{17}$ |
| $Z_{17}$ | $S_{13}$ | $S_9$ | $Z_{35}$ | $S_{22}$ | $S_{18}$ | $Z_{53}$ | $S_4$ | $S_{27}$ | $Z_{18}$ |
| $Z_{18}$ | $S_{14}$ | $S_{18}$ | $Z_{36}$ | $S_{23}$ | $S_{27}$ | $Z_{54}$ | $S_5$ | $S_9$ | $Z_1$ |

FIG. 7

MOTOR

CROSS REFERENCE TO RELATED APPLICATIONS

This non-provisional patent application claims priority under 35 U.S.C. §119(a) from Patent Application No. 200910108820.1 filed in The People's Republic of China on Jul. 20, 2009.

FIELD OF THE INVENTION

This invention relates to an electric motor, and in particular to a multi-pole motor which comprises a stator, brushes and a rotor with a commutator. The term "multi-pole motor" as used in the specification and the appended claims, means a motor having four or more stator poles.

BACKGROUND OF THE INVENTION

A commutator motor generally comprises a stator having a plurality of stator poles and a rotor having a rotor shaft, a rotor core fixed to the shaft, a commutator fixed to the shaft and a rotor windings wound about poles of the rotor core and electrically connected to segments of the commutator. Brushes transfer electrical power to the windings via the commutator. The number of brushes generally increases with an increase in the number of the stator poles. For example, a two pole motor usually has two brushes, and a four pole motor usually has four brushes. The increase in the number of brushes increases the cost as well as the size of the motor.

As is known, wave winding is one methods to reduce the number of brushes. However, traditional wave windings require the motor to have a rotor with an odd number of winding slots and a commutator with an odd number of segments, and also require the number of the winding slots (rotor poles) as well as the number of segments to be not a multiple of the number of stator poles. Therefore, wave windings are limited to some specific motors. Further more, traditional wave windings are wound by a winding machine using a single flyer due to the odd number of coils, which takes more time than using a dual flyer winding machine.

It is desired to develop an improved multi-pole motor, particularly a motor which has an even number of segments.

SUMMARY OF THE INVENTION

Accordingly, in one aspect thereof, the present invention provides a motor comprising a stator and a rotor, the stator comprising 2P poles where P is an integer greater than one, the rotor comprising a shaft, a rotor core and a commutator fixed onto the shaft, wherein the commutator comprises m segments where m is an even integer greater than P, every two adjacent segments being electrically connected together by a winding unit so that the rotor winding comprises m winding units; at least one of the winding units comprising P coils connected in series; and each coil of each winding unit is directly connected to a corresponding two segments.

Preferably, m is a multiple of P, and the rotor core comprises n teeth, wherein n is a multiple of P and is greater than P.

Preferably, the m winding units comprise: one winding unit comprising only one coil; P−1 winding units each of which comprise P+1 coils connected in series; and m−P winding units each of which comprise P coils connected in series.

Preferably, for a winding unit connected to first segment ZX and an adjacent second segment ZX+1 and comprising more than one coil, every two adjacent coils of the winding unit is directly connected to a shared segment ZY which is under the same polarity as the first segment ZX or the second segment ZX+1.

Preferably, along one circumferential direction of the commutator, the distance from the first segment ZX to the shared segment ZY measured in the number of segments is greater or smaller than the distance from the shared segment ZY to the second segment ZX+1 measured in the number of segments.

Preferably, each coil of the m winding units has a coil pitch substantially equal to the pole pitch.

Preferably, all coils of the same winding unit have the same winding direction.

Preferably, for a first winding unit connected to the first segment ZX and the adjacent second segment ZX+1, and a second winding unit connected to the second segment ZX+1 and the adjacent third segment ZX+2, the winding direction of each coil of the first winding unit is opposite to the winding direction of each coil of the second winding unit.

Preferably, m is a multiple of n.

Preferably, P, m and n satisfies one of the conditions: P=2, m=36, n=18; P=2, m=52, n=26; and P=3, m=54, n=27.

Preferably, the motor comprises two brushes in sliding contact with segments of the commutator.

Preferably, the stator comprises a stator core, the stator core comprising a yoke portion and 2P teeth extending inwardly from the yoke portion, wherein P teeth function as primary salient poles, and the remaining P teeth function as auxiliary salient poles, the primary salient poles and the auxiliary salient poles being arranged alternately along a circumferential direction of the yoke.

Preferably, each of the primary salient poles has a concentrated field coil wound thereon, and each of the auxiliary salient poles has no field coil wound thereon or has a concentrated field coil that has less turns than the field coil of the primary salient pole.

A motor according to preferred embodiments of the present invention has an even number of segments, therefore the rotor winding may be wound quickly using a dual flyer winding machine. The number of brushes can be reduced by implementing the winding scheme according to the present invention.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 3 illustrates a winding of a rotor of the universal motor of FIG. 1;

FIG. 4 is a winding table illustrating the connection relationships between winding slots, rotor winding and segments of the motor of FIG. 1;

FIG. 6 is a winding table illustrating connection relationships of winding slots, rotor winding and segments of a multi-pole motor according to another embodiment of the present invention; and FIG. 7 is a winding table illustrating connection relationships of rotor winding and segments of another multi-pole motor according to a further embodiment of the present invention.

DETAILED DESCRIPTION OF THE PREFERRED EMBODIMENTS

The present invention provides a motor which comprises a stator having four or more poles and a rotor having an even number of teeth (slots) and a commutator with an even number of segments. The number of the brushes is reduced by implementing the present invention.

Figure 1:
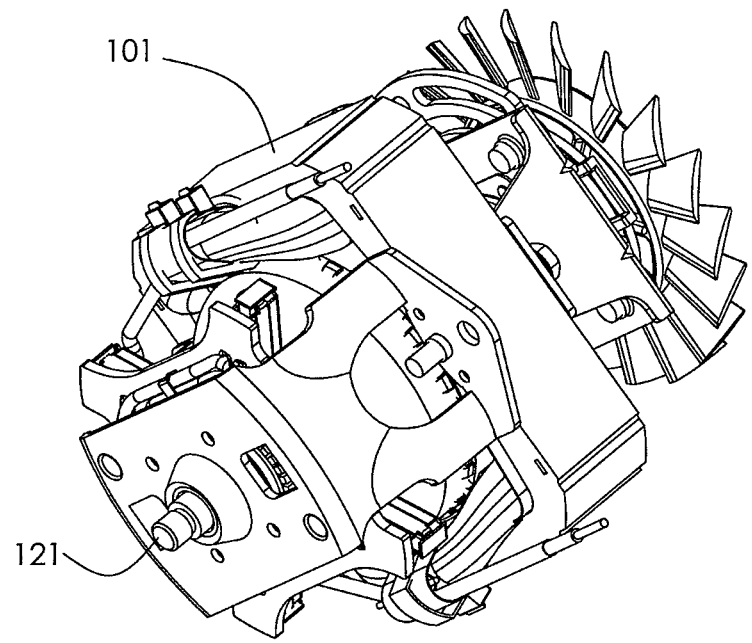
FIG. 1 illustrates a universal motor according to one embodiment of the present invention.
Figure 2:
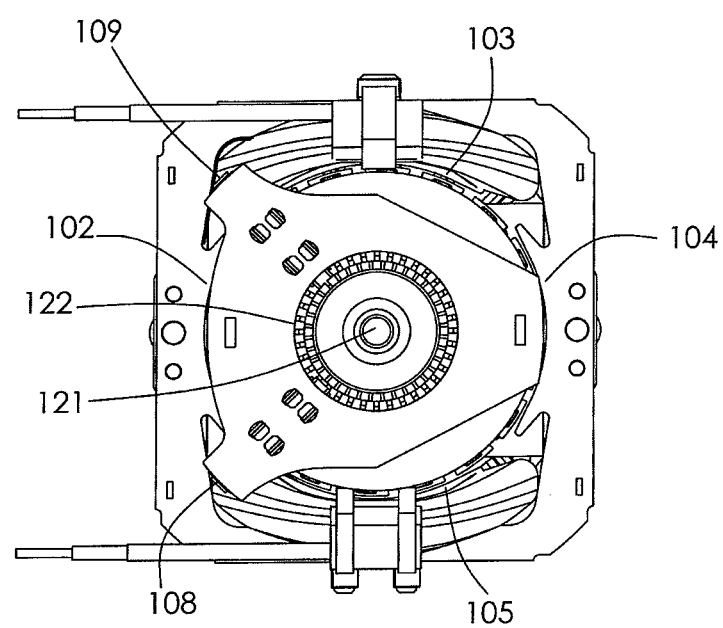
FIG. 2 is a plan view of the universal motor of FIG. 1 with a bearing bracket removed.

FIG. 1 illustrates a universal motor according to one preferred embodiment of the present invention, and FIG. 2 is a plan view of the universal motor with a bear bracket removed to reveal the commutator 122. The universal motor according to this embodiment is a single-phase series motor, comprising a stator and a rotor rotatably mounted to and confronting the stator. The stator comprises a stator core 101 and two brushes 108, 109 located at one axial end of the stator. The stator core 101 is formed by stacking laminations in an axial direction of the motor, and comprises a yoke portion and salient poles 102~105 inwardly extending from the yoke portion, wherein the salient poles 102 and 104 have field coils wound thereon and function as primary poles, while the salient poles 103 and 105 have no field coils wound thereon and function as auxiliary poles. Alternatively, the auxiliary poles can have fielding coils each of which has less turns than that of primary poles. The primary poles 102, 104 and the auxiliary poles 103, 105 are alternately arranged in a circumferential direction of the stator core 101. Electrical connection of the field coils is controlled by a control unit (not shown) so that four poles are formed by the stator. In other words, the number of pole pairs of the motor, referred to as P hereafter, is 2. The method of forming a pole by field coils is known in the art.

The rotor comprises a rotor shaft 121, a rotor core fixed to the shaft 121, a commutator 122 fixed to the shaft 121 adjacent to the rotor core, and a rotor winding wound about teeth of the rotor core and electrically connected to segments of the commutator 122. In this embodiment, the rotor core comprises eighteen teeth, and the commutator 122 comprises thirty-six segments. The number of the segments is a multiple of the number of the teeth, which is a multiple of the number of pole pairs.

FIG. 3 and FIG. 4 illustrate the connection relationships of the rotor winding. Referring to FIG. 3, the top row represents two brushes 108 and 109, the second row represents the thirty-six segments $Z_1$~$Z_{36}$ of the commutator, the third row representing the eighteen teeth of the rotor core and eighteen winding slots $S_1$~$S_{18}$ formed by the teeth, and the fourth row representing the four poles 102~105 of the stator. In the winding procedure, the wire starts from segment $Z_1$, and then passes through winding slots $S_5$ and $S_1$ repeatedly to form a coil which winds about the four teeth between the winding slots $S_5$ and $S_1$, and then the wire is connected to segment $Z_{19}$. Then, the wire starting from segment $Z_{19}$ passes through winding slots $S_{14}$ and $S_{10}$ to form a coil which winds about the teeth between winding slots $S_{14}$ and $S_{10}$, and then the wire is connected to segment $Z_2$, which is adjacent to segment $Z_1$. In other words, segment $Z_1$ is electrically connected to segment $Z_2$ by two coils which are connected in series and connected to a shared segment $Z_{19}$, which is substantially under the same polarity as segment $Z_1$. As used in the specification and the appended claims, two or more segments under the same polarity means that the two or more segments are separated from each other by the distance between poles of same polarity. As is known, for a motor having 2P alternate poles and a commutator of m segments, the distance between poles of the same polarity measured in the number of segments is equal to m/P. For simplicity, the m segments are referred to as segments $Z_1, Z_2, \ldots, Z_x, Z_y, \ldots, Z_m$, wherein $1 \leq x \leq m$ and $1 \leq y \leq m$. Segment $Z_x$ and $Z_y$ should be under the same polarity if $|y-x|$ is equal to m/P or a multiple of m/P. Still referring to FIG. 3 and FIG. 4, the motor according to the preferred embodiment has 4 or 2×2 alternate poles and 36 segments, and segments Zx and Zy are under the same polarity if $|y-x|$ equal to 18 or 36/2.

Segment $Z_2$ is electrically connected to segment $Z_3$ by a winding unit which comprises two coils connected in series. One of the two coils is wound about the teeth between the winding slots $S_6$ and $S_{10}$, and the other coil is wound about the teeth between the winding slots $S_{15}$ and $S_1$. The two coils are also connected to a shared segment $Z_{20}$ which is under the same polarity as segment $Z_2$.

Similar to the electrical connection of segment $Z_1$ and $Z_2$, segment $Z_3$ is electrically connected to segment $Z_4$ by a winding unit which comprises two coils connected in series. One of the two coils is wound about the teeth between the winding slots $S_6$ and $S_2$, and the other coil is wound about the teeth between the winding slots $S_{15}$ and $S_{11}$. The two coils are also connected to a shared segment $Z_{21}$ which is under the same polarity as segment $Z_3$.

Similar to the electrical segment $Z_2$ and $Z_3$, segment $Z_4$ is electrically connected to segment $Z_5$ by a winding unit which comprises two coils connected in series. One of the two coils is wound about the teeth between the winding slots $S_7$ and $S_{11}$, and the other coil is wound about the teeth between the winding slots $S_{16}$ and $S_2$. The two coils are also connected to a shared segment $Z_{22}$ which is under the same polarity as segment $Z_4$.

In other words, every two adjacent segments are electrically connected by a winding unit. In most cases, the winding unit comprises two coils connected in series. However, segments $Z_{18}$ and $Z_{19}$ are electrically connected by a winding unit comprising three coils connected in series, and segment $Z_{36}$ and $Z_1$ are electrically connected by a winding unit comprising only one coil.

In other words, for a motor comprising 2P alternate poles and a commutator of m segments $Z_1$~$Z_m$, wherein P is an even integer greater than 1 and m is a multiple of P, every two adjacent segments are connected by a winding unit, so that the rotor winding has m winding units, wherein:

(1) the winding unit connected to segments $Z_m$ and $Z_1$ comprises only one coil;

(2) for $1 \leq x$, $x+1 \leq m$ and x is multiple of m/P, the winding unit connected to segments $Z_x$ and $Z_{x+1}$ comprises P+1 coils connected in series. Every two adjacent coils of the winding unit are connected to a shared segment that is under the same polarity as segment $Z_x$ or $Z_{x+1}$; it should be understood that there are P+1 such winding units; and (3) for $1 \leq x$, $x+1 \leq m$ and x is not a multiple m/P, the winding unit connected to segments $Z_x$ and $Z_{x+1}$ comprises P coils connected in series, and every two adjacent segments of the winding unit P coils are connected to a shared segment that is under the same polarity as segment $Z_x$ or $Z_{x+1}$. It should be understood that there are m−P such winding units.

In addition, the coil pitch (referred to hereafter as q) is preferably equal to the pole pitch as much as possible to improve the motor's performance and to shorten the lead wires of the coils. For a motor having a stator of 2P stator poles and a rotor of n teeth, a pole pitch is expressed as n/2P. The coil pitch q preferably satisfies the equation $|q-n/2P|<1$. For the exemplary motor shown in FIG. 3 and FIG. 4, the pole pitch is equal to 4.5 or 18/4, and coil pitch is 4.

Furthermore, as is mentioned, for the winding unit connected to segment $Z_x$ and $Z_{x+1}$ and comprising more than one coil, every two adjacent coils are connected to a shared segment $Z_y$, which is under the same polarity as segment $Z_x$ or $Z_{x+1}$. That is, $|y-x|$ equal to a multiple of m/P or $|(x+1)-y)|$ equal to a multiple of m/P. Along one circumferential direction of the commutator, the distance from segment $Z_x$ to segment $Z_y$ is not equal to the distance from segment $Z_y$ to segment $Z_{x+1}$. For example, the winding unit connected to segment $Z_1$ and $Z_2$ comprises two coils, and the two coils are connected to a shared segment $Z_{19}$. From a circumferential direction of segment $Z_1$—segment $Z_{19}$—segment $Z_2$, there are seventeen segments $Z_2$~$Z_{18}$ between segment $Z_1$ and segment $Z_{19}$, and there are eighteen segments $Z_{20}$~$Z_{36}$~$Z_1$ between segment $Z_{19}$ and segment $Z_2$.

Furthermore, the winding direction of the coils of the same winding unit is the same, for example, wound in clockwise or counter-clockwise direction. However, for the two winding units connected to adjacent three segments respectively, winding direction of coils of the first winding unit is different from winding direction of coils of the second winding unit. This is because the two winding units are under different polarity. For example, the coils of the winding unit connected to segment $Z_1$ and $Z_2$ are wound in clockwise direction, while coils of the winding unit connected to segment $Z_2$ and $Z_3$ are wound in the counter-clockwise direction.

Figure 5:
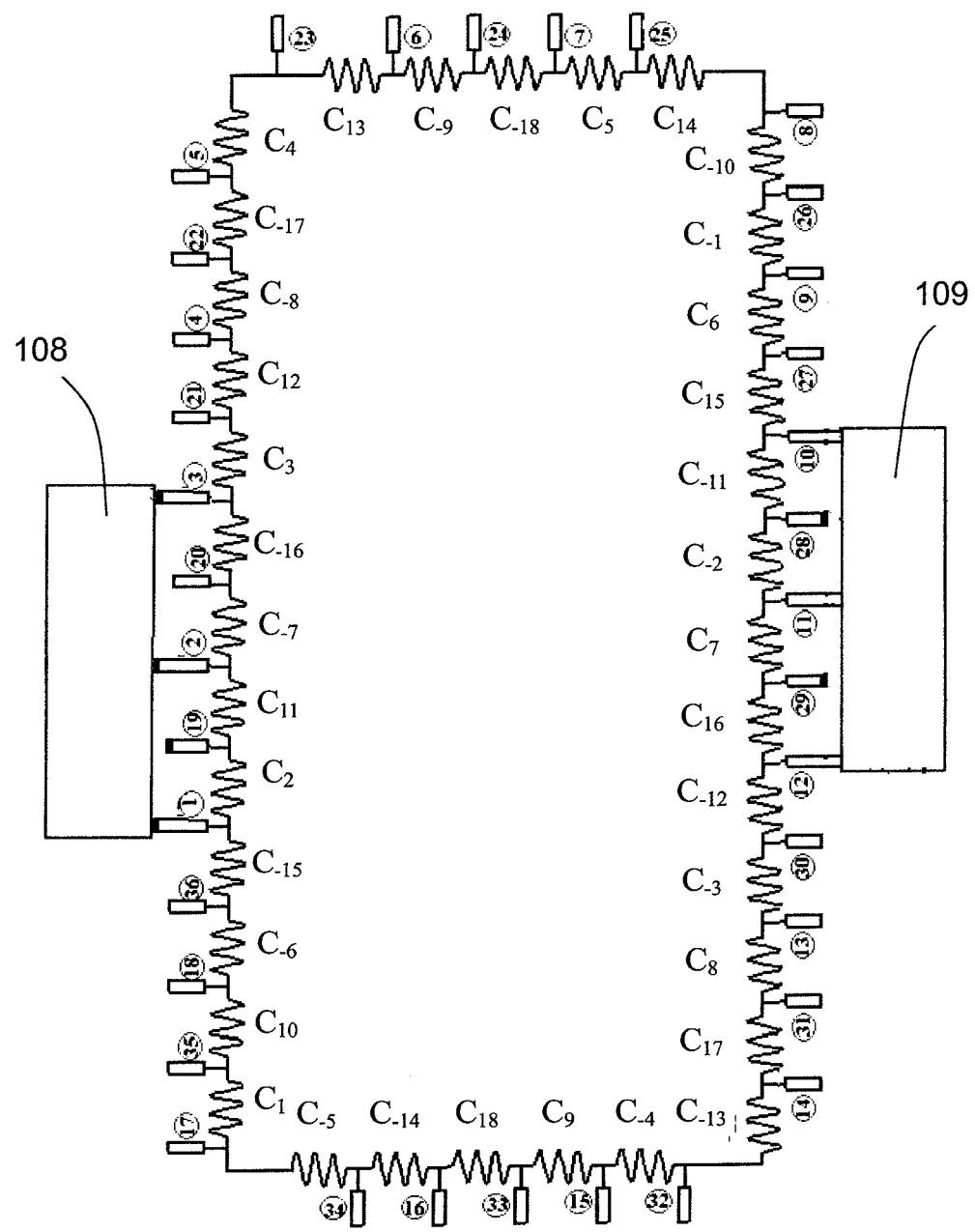
FIG. 5 illustrates electrical connection relationships of the rotor winding, segments and brushes of the motor of FIG. 1.

FIG. 5 illustrates the electrical connection relationship of the rotor winding, the segments and the brushes of the motor. In FIG. 5, the small rectangle boxes represent the segments of the commutator; for example, the small rectangle box with a numeral label 1 represent segment $Z_1$. The wavy lines represent the coils connected to segments, wherein a coil with a minus label such as $C_{-1}$ means the coil is wound in counter-clockwise direction, and a coil with a positive label such as $C_1$ means the coil is wound in clockwise direction.

The motor of FIG. 5 comprises m winding units. As mentioned above, each winding unit comprises one, P or P+1 coils, and the m winding units totally comprises m·P coils. The m·P coils forms two parallel branches both of which are connected to brushes 108 and 109. Brush 108 and 109 are apart about 90 mechanical degree. As is shown in FIG. 5, each brush will short three segments during commutation. For example, segments $Z_1$, $Z_2$ and $Z_3$ are shorted by brush 108, and coils $C_2$, $C_{11}$, $C_{-7}$ and $C_{-16}$ are thereby shorted by brush 108. Segments $Z_{10}$, $Z_{11}$ and $Z_{12}$ are shorted by brush 109, and coils $C_{-11}$, $C_{-2}$, $C_7$ and $C_{16}$ are thereby shorted by brush 109. It will be apparent that if more brushes are used, more coils will be shorted. In other words, the motor according to the preferred embodiment uses a reduced number of brushes so that a reduced number of coils are shorted, and the motor performance is improved. Further more, the m·P coils forms only two parallel branches, so that the motor can survive in high voltage.

FIG. 6 is a winding table illustrating the connection relationships of a rotor winding, winding slots, and segments according to another embodiment of the present invention. The motor comprises two brushes, a stator with four poles (2P=4), and a rotor with 26 teeth (n=26) and a commutator with 52 segments (m=52). For simplicity, the 52 segments are named segments $Z_1$ to $Z_{52}$ respectively. The winding scheme has the following features:

(1) every two adjacent segments are electrically connected by a winding unit comprising one coil or more than one coil connected in series, and both ends of each coil are directly connected to corresponding segments;

(2) for $1 \le x$, $x+1 \le m$ and x is not multiple of m/P, the winding unit connected to segment $Z_x$ and $Z_{x+1}$ comprises P coils connected in series, and every two adjacent coils of the winding unit are connected to a shared segment that is under the same polarity as segment $Z_x$, or $Z_{x+1}$; the number of such winding units is m–P;

(3) the winding unit connected to segment $Z_m$, and to segment $Z_1$ comprises only one coil;

(4) for $1 \le x$, $x+1 \le m$ and x is multiple of m/P, the winding unit connected to segments $Z_x$ and $Z_{x+1}$ comprises P+1 coils connected in series, and every two adjacent coils of the winding unit are connected to a shared segment that is under the same polarity as segment $Z_x$ or $Z_{x+1}$ the number of such winding units is P–1; and (5) each coil has a coil pitch approximately equal to one pole pitch, wherein the pole pitch is expressed as m/2P.

FIG. 7 illustrates another winding table according to a further embodiment of the present invention. The motor comprises a stator with 6 poles (2P=6) and two brushes, a rotor with a rotor core of 27 teeth (n=27) and a commutator of 54 segments (m=54). For simplicity, the 54 segments are named segments $Z_1$ to $Z_{54}$ respectively. The winding scheme shown in FIG. 7 also has similar features to the winding scheme shown in FIG. 6.

The winding scheme according to the present invention can be implemented in a universal motor, or a permanent magnet direct current (PMDC) motor, and the motor is preferably used in a food processing machine, power juicer, blower, grinding machine, washing machine, cleaner etc.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A motor comprising a stator and a rotor, the stator comprising 2P poles where P is an integer greater than one, the rotor comprising a shaft, a rotor core and a, commutator fixed onto the shaft,
wherein the commutator comprises m segments where m is an even integer greater than P, every two adjacent segments being electrically connected together by a winding unit so that the rotor winding comprises m winding units; at least one of the winding units comprising P coils connected in series;
each coil of each winding unit is directly connected to a corresponding two segments; and
wherein the m winding units comprise:
one winding unit comprising only one coil;
P–1 winding units each of which comprise P+1 coils connected in series; and
m-P winding units each of which comprise P coils connected in series.

2. The motor of claim 1, wherein along one circumferential direction of the commutator, a distance between a pair of segments which are respectively connected to opposite ends of one of the coils is not equal to a distance between another pair of segments which are respectively connected to opposite ends of another one of the coils.

3. The motor of claim 1, wherein all coils of the same winding unit have the same winding direction; and for a first winding unit connected to the first segment $Z_X$ and the adjacent second segment $Z_{X+1}$, and a second winding unit connected to the second segment $Z_{X+1}$ and the adjacent third segment $Z_{x+2}$, the winding direction of each coil of the first winding unit is opposite to the winding direction of each coil of the second winding unit.

4. The motor of claim 1, wherein all coils of the same winding unit have the same winding direction; and wherein for a first winding unit connected to the first segment $Z_X$ and the adjacent second segment $Z_{X+1}$, and a second winding unit connected to the second segment $Z_{X+1}$ and the adjacent third segment $Z_{X+2}$, the winding direction of each coil of the first winding unit is opposite to the winding direction of each coil of the second winding unit.

5. A motor comprising a stator and a rotor, the stator comprising 2P poles where P is an integer greater than one, the rotor comprising a shaft, a rotor core and a commutator fixed onto the shaft,
   wherein the commutator comprises m segments where m is an even integer greater than P, every two adjacent segments being electrically connected together by a winding unit so that the rotor winding comprises m winding units; at least one of the winding units comprising P coils connected in series;
   each coil of each winding unit is directly connected to a corresponding two segments; and
   wherein for a winding unit connected to first segment $Z_X$ and an adjacent second segment $Z_{X+1}$ and comprising more than one coil, every two adjacent coils of the winding unit is directly connected to a shared segment $Z_Y$ which is under the same polarity as the first segment $Z_X$ or the second segment $Z_{X+1}$.

6. The motor of claim 5, wherein along one circumferential direction of the commutator, the distance from the first segment $Z_X$ to the shared segment $Z_Y$ measured in the number of segments is greater or smaller than the distance from the shared segment $Z_Y$ to the second segment $Z_{x+1}$ measured in the number of segments.

7. The motor of claim 5, wherein each coil of the m winding units has a coil pitch substantially equal to the pole pitch.

8. The motor of claim 5, wherein m is a multiple of P, and the rotor core comprises n teeth, wherein n is a multiple of P and is greater than P.

9. The motor of claim 8, wherein m is a multiple of n.

10. The motor of claim 8, wherein P, m and n satisfies one of the conditions:
   P=2, m=36, n=18;
   P=2, m=52, n=26; and
   P=3, m=54, n=27.

11. The motor of claim 8, wherein m is twice n.

12. The motor of claim 5, wherein the motor comprises two brushes in sliding contact with segments of the commutator.

13. The motor of claim 5, wherein the stator comprises a stator core, the stator core comprising a yoke portion and 2P teeth extending inwardly from the yoke portion, wherein P teeth function as primary salient poles, and the remaining P teeth function as auxiliary salient poles, the primary salient poles and the auxiliary salient poles being arranged alternately along a circumferential direction of the yoke, wherein electrical connection of the field coils is designed such that 2P poles are formed by the stator.

14. The motor of claim 13, wherein each of the primary salient poles has a concentrated field coil wound thereon, and each of the auxiliary salient poles has no field coil wound thereon or has a concentrated field coil that has less turns than the field coil of the primary salient pole.

15. The motor of claim 5, wherein no segments are short circuited.

16. The motor of claim 5, wherein the m winding units comprise one winding unit comprising only one coil.

17. The motor of claim 5, wherein the m winding units comprise:
   one winding unit comprising only one coil;
   P−1 winding units each of which comprise P+1 coils connected in series; and
   m-P winding units each of which comprise P coils connected in series.

18. The motor of claim 5, wherein all coils of the same winding unit have the same winding direction; and wherein for a first winding unit connected to the first segment $Z_X$ and the adjacent second segment $Z_{X+1}$, and a second winding unit connected to the second segment $Z_{X+1}$ and the adjacent third segment $Z_{X+2}$, the winding direction of each coil of the first winding unit is opposite to the winding direction of each coil of the second winding unit.

19. The motor of claim 5, wherein along one circumferential direction of the commutator, a distance between a pair of segments which are respectively connected to opposite ends of one of the coils is not equal to a distance between another pair of segments which are respectively connected to opposite ends of another one of the coils.

20. A motor comprising a stator and a rotor, the stator comprising 2P poles where P is an integer greater than one, the rotor comprising a shaft, a rotor core and a commutator fixed onto the shaft,
   wherein the commutator comprises m segments where m is an even integer greater than P, every two adjacent segments being electrically connected together by a winding unit so that the rotor winding comprises m winding units; at least one of the winding units comprising P coils connected in series;
   each coil of each winding unit is directly connected to a corresponding two segments;
   all coils of the same winding unit have the same winding direction; and
   wherein for a first winding unit connected to the first segment $Z_X$ and the adjacent second segment $Z_{X+1}$, and a second winding unit connected to the second segment $Z_{X+1}$ and the adjacent third segment $Z_{X+2}$, the winding direction of each coil of the first winding unit is opposite to the winding direction of each coil of the second winding unit.

21. The motor of claim 20, wherein along one circumferential direction of the commutator, a distance between a pair of segments which are respectively connected to opposite ends of one of the coils is not equal to a distance between another pair of segments which are respectively connected to opposite ends of another one of the coils.

* * * * *